US008102334B2

(12) United States Patent
Brown et al.

(10) Patent No.: US 8,102,334 B2
(45) Date of Patent: Jan. 24, 2012

(54) AUGMENTING REALITY FOR A USER

(75) Inventors: William A. Brown, Raleigh, NC (US);
Richard W. Muirhead, Tyler, TX (US);
Francis X. Reddington, Sarasota, FL
(US); Martin A. Wolfe, Alpharetta, GA
(US)

(73) Assignee: International Businesss Machines Corporation, Armonk, NY (US)

( * ) Notice: Subject to any disclaimer, the term of this patent is extended or adjusted under 35 U.S.C. 154(b) by 1104 days.

(21) Appl. No.: 11/940,850

(22) Filed: Nov. 15, 2007

(65) Prior Publication Data

US 2009/0128449 A1 May 21, 2009

(51) Int. Cl.
*G09G 5/00* (2006.01)
(52) U.S. Cl. .............................................. 345/8; 345/9
(58) Field of Classification Search .................. 345/7–9, 345/156–158; 463/30–34
See application file for complete search history.

(56) References Cited

U.S. PATENT DOCUMENTS

| 7,053,916 | B2 | 5/2006 | Kobayashi et al. |
| 7,113,618 | B2 | 9/2006 | Junkins et al. |
| 7,215,322 | B2 * | 5/2007 | Genc et al. ..................... 345/157 |
| 2003/0210228 | A1 | 11/2003 | Ebersole et al. |

* cited by examiner

*Primary Examiner* — Regina Liang
(74) *Attorney, Agent, or Firm* — Brandon C. Kennedy; Mark Vallone; Biggers & Ohanian, LLP.

(57) ABSTRACT

Augmenting reality for a user including creating a model of a region of the user's environment in a direction of the user's field of vision; determining, in dependence upon the model of the region of the user's environment, that an object located within the user's environment is invisible to the user; determining, in dependence upon the direction of the user's field of vision, the object's location, and the model of the region of the user's environment, a location to display a representation of the object on a transparent display in front of the user's field of vision; and displaying the representation of the object at the determined location on the transparent display in front of the user's field of vision.

18 Claims, 3 Drawing Sheets

US 8,102,334 B2

AUGMENTING REALITY FOR A USER

BACKGROUND OF THE INVENTION

1. Field of the Invention

The field of the invention is data processing, or, more specifically, methods, apparatus, and products for augmenting reality for a user.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today may be capable of gathering information that exceeds the information gathering capabilities of a user. In some cases it may be beneficial to use this information gathered by computer systems to supplement the user's current knowledge at any given time. One such case in which information gathered by computer systems may be useful to supplement the user's current knowledge is when user is incapable of viewing objects within the user's field of vision. Examples of objects in which a user may be incapable of viewing may include a ball behind a car, an item in a closed cabinet, a person behind a door, and so on. If computer systems have gathered information about the objects not viewable by the user it would be useful to supplement the user's knowledge with the gathered information.

SUMMARY OF THE INVENTION

Methods, apparatus, and products for augmenting reality for a user are disclosed that include creating a model of a region of the user's environment in a direction of the user's field of vision; determining, in dependence upon the model of the region of the user's environment, that an object located within the user's environment is invisible to the user; determining, in dependence upon the direction of the user's field of vision, the object's location, and the model of the region of the user's environment, a location to display a representation of the object on a transparent display in front of the user's field of vision; and displaying the representation of the object at the determined location on the transparent display in front of the user's field of vision.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
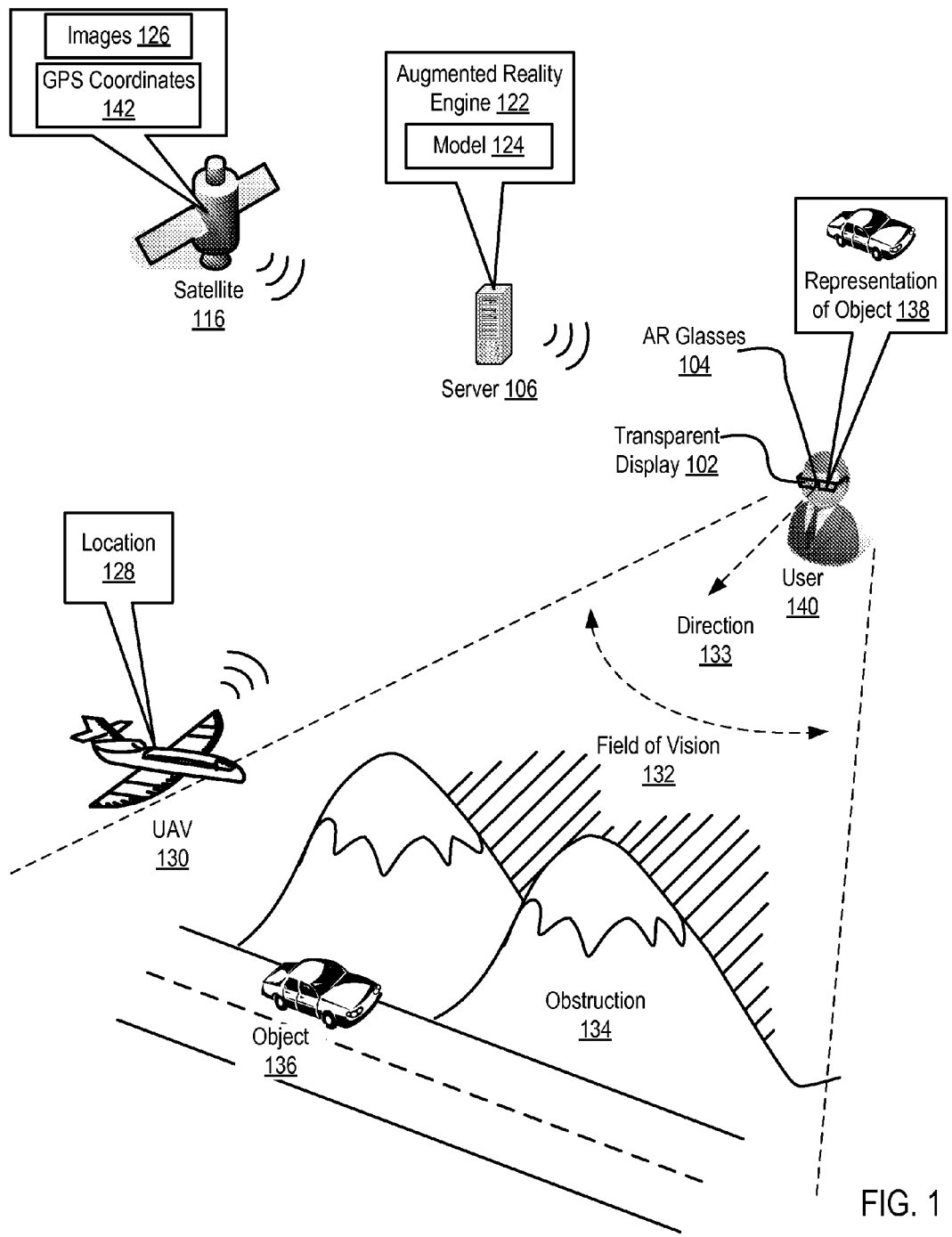
FIG. 1 sets forth a functional block diagram of a system for augmenting reality for a user according to embodiments of the present invention.

Exemplary methods, apparatus, and products for augmenting reality for a user in accordance with the present invention are described with reference to the accompanying drawings, beginning with FIG. 1. FIG. 1 sets forth a functional block diagram of a system for augmenting reality for a user (140) according to embodiments of the present invention. The system of FIG. 1 operates generally for augmenting reality for a user according to embodiments of the present invention The system of FIG. 1 includes an augmented reality engine (122) installed on a server (106). An augmented reality engine is a module of computer program instructions useful in augmenting reality for a user according to embodiments of the present invention. The augmented reality engine (122) operates for augmenting reality for a user (140) by creating a model (124) of a region of the user's environment in a direction (133) of the user's field of vision (132); determining, in dependence upon the model (124) of the region of user's environment, that an object (136) located within the user's environment is invisible to the user (140); and determining, in dependence upon the direction (133) of the user's field of vision (132), the object's location (128), and the model of the region of the user's environment (124), a location to display a representation of the object on a transparent display (102) in front of the user's field of vision (132).

A user's field of vision is an area which a user is capable of viewing with no obstruction through the transparent display (102). A user's field of vision may vary depending upon the implementation of the transparent display. In this specification the exemplary transparent display is implemented in a pair of glasses for clarity only. A transparent display may also be implemented in goggles, binoculars, a windshield in an automobile, and so on as will occur to those of skill in the art. The magnification and angular visibility, and therefore the user's field of vision through the transparent display, may vary between implementations of the transparent display.

A region of the user's environment is an area having dimensions that may be defined by a user and is typically directed in the same direction as the user's field of vision. A direction of the user's field of vision is the orientation of the user. If a user is oriented north, for example, the direction of user's field of vision is north. A region may be defined by a user, for example, as a the area within a 170 degree circular arc protruding from the user having a radius of one mile with a bisection of the arc aligned with the orientation of the user. Typically the region of the user's environment in the direction of the user's field of vision is an area that closely resembles the user's actual field of vision.

The region of the user's environment in the direction of the user's field of vision may include objects currently invisible to the user as well as objects currently visible. An object (136) invisible to the user (140) is an object within the region of the user's environment in the direction of the user's field of vision that is not currently visible to the user. Exemplary reasons that an object may be invisible to a user include that an obstruction (134) exists between the user (140) and the object (136), the object is in an area of low light, the weather impedes the user's vision of the object, and other reasons as will occur to those of skill in the art.

A model of the region of the user's environment in the direction of the user's field of vision may be a three dimensional map of the user's environment defined by a grid representing latitude, longitude, and altitude. The augmented reality engine (122) may create the model (124) of the region of the user's environment in dependence upon images of the user's environment and global positioning system ('GPS') coordinates. The augmented reality engine of FIG. 1, for example, may create the model (124) of the region of the user's environment in dependence upon the images (126) and the GPS coordinates (142) received from a satellite (116). The satellite (116) of FIG. 1 transmits such images (126) and coordinates to the server (106) through a wireless communication channel. Readers of skill in the art will recognize that any number of devices capable of capturing images may transmit such images (126) to the augmented reality engine for creating the model of the region of the user's environment. Readers of skill in the art will recognize that there are other ways of creating a model of the region of the user's environment including, for example, using relief map data, blueprint data, or other data describing the region of the user's environment in the direction of user's field of vision.

In the system of FIG. 1 the augmented reality engine (122) receives the location (128) of the object (136) from the unmanned aerial vehicle ('UAV') (130) through a wireless communications channel. Readers of skill in the art will recognize that the UAV is shown here for clarity, but the augmented reality engine (122) may receive the location (128) of the object (136) in various ways. The augmented reality engine (122), for example, may be pre-configured with the location of a stationary object, may receive the location from a GPS tracking device installed on the object, or in other ways as will occur to those of skill in the art.

The system of FIG. 1 also includes a pair of augmented reality ('AR') glasses that includes the transparent display (102). The AR glasses (104) include a display module (not shown in FIG. 1). The display module is a module of computer program instructions that operates for augmenting the reality of a user by displaying the representation (138) of the object (136) at the determined location on the transparent display (102) in front of the user's field of vision. A representation of an object may be implemented in various ways. A representation of the object may, for example, include an image of the object or a symbol representing the object. A representation of the object may be an opaque image or a translucent image. A representation may be implemented in any shape or size.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Augmenting reality for a user in accordance with the present invention is generally implemented with computers, that is, with automated computing machinery. In the system of FIG. 1, for example, the server and AR glasses are implemented to some extent at least as computers. For further explanation, therefore, FIG. 2 sets forth a block diagram of automated computing machinery comprising an exemplary pair of augmented reality glasses (104) useful in augmenting reality for a user according to embodiments of the present invention. The pair of augmented reality glasses (104) of FIG. 2 includes at least one computer processor (156) or 'CPU' as well as random access memory (168) ('RAM') which is connected through an expansion bus (160) to processor (156) and to other components of the computer.

Figure 2:
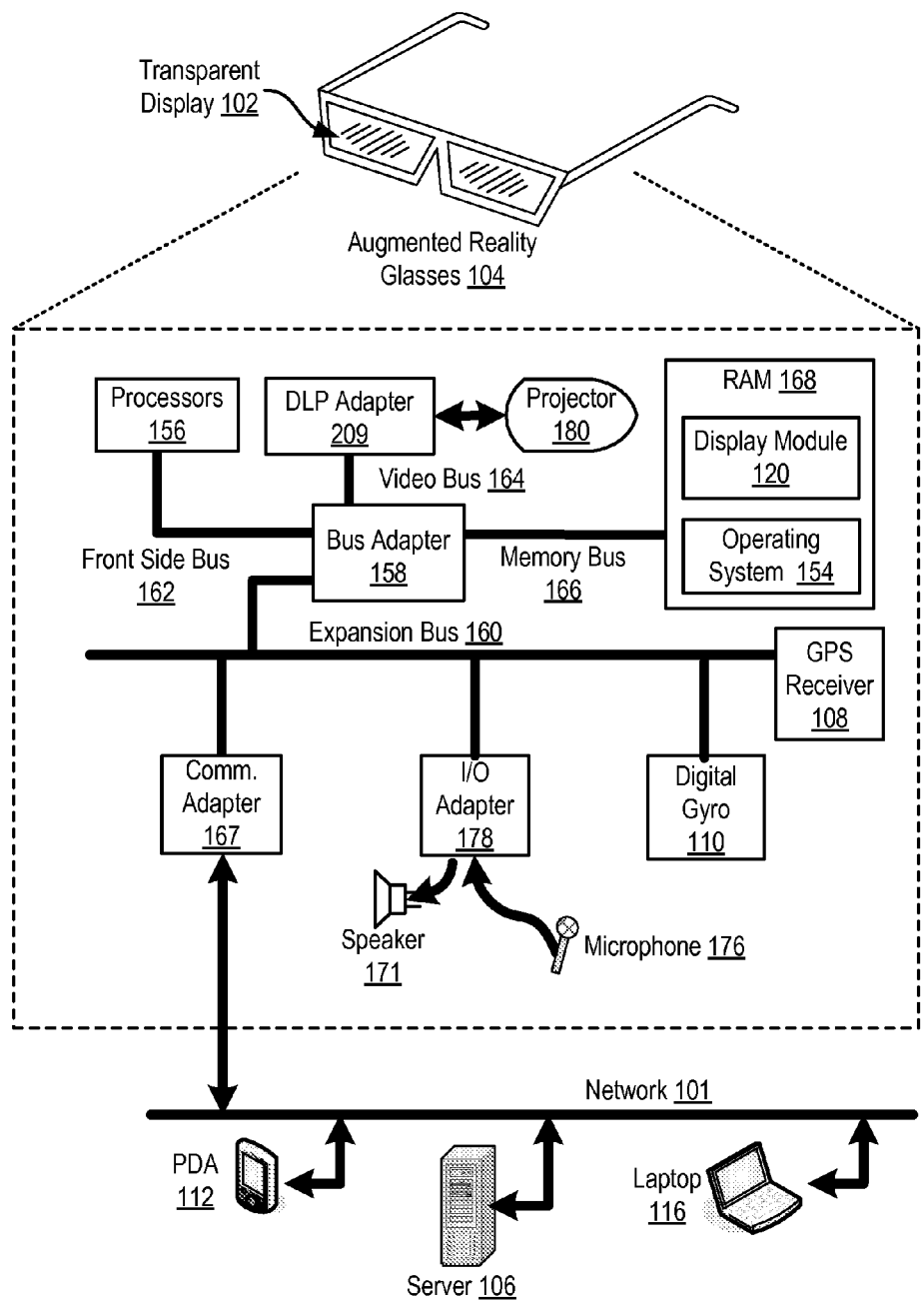
FIG. 2 sets forth a block diagram of automated computing machinery comprising an exemplary pair of augmented reality glasses useful in augmenting reality for a user according to embodiments of the present invention.

Stored in RAM (168) is a display module (120), computer program instructions for displaying representations of an object on the transparent display (102). The display module (120) is capable of rendering a display of the representation of the object by using a projector (180). The projector (180) renders a display on the transparent display (102) for viewing by the user. The exemplary projector (180) of FIG. 2 is implemented with Digital Light Processing ('DLP') technology originally developed at Texas Instruments™. The projector in FIG. 2 is connected to other components of the exemplary pair of AR glasses (104) through a DLP adapter (209) and a Video Bus (164). Other technologies useful in implementing the projector (180) may include liquid crystal display ('LCD') technology and liquid crystal on silicon ('LCOS') technology.

Also stored in RAM (168) is an operating system (154). Operating systems useful in augmented reality devices according to embodiments of the present invention include UNIX™, Linux™, Microsoft XP™, Microsoft Vista™, AIX™, IBM's i5/OS™, and others as will occur to those of skill in the art. Operating system (154) and display module (120) in the example of FIG. 2 are shown in RAM (168), but many components of such software typically are stored in non-volatile memory also.

The exemplary pair of AR glasses (104) of FIG. 2 includes a global position system ('GPS') receiver (108). A GPS receiver (108) is device that receives from a GPS satellite network a steady stream of GPS data describing the receiver's location. The exemplary GPS receiver (108) of FIG. 2 may transmit a user's location to an augmented reality engine running on the server (106) for creating a model of the region of the user's environment and for determining a location to display the representation of the object.

The exemplary pair of AR glasses (104) of FIG. 2 also includes a digital gyroscope (110). A gyroscope is a device for measuring or maintaining orientation based on the principle of conservation of angular momentum. Digital gyroscopes may be used to determine the orientation of a device in which the gyroscope is included. In the example of FIG. 2 the digital gyroscope may be used to determine a user's orientation. That is, the digital gyroscope of FIG. 2 may be used to determine the direction of the user's field of vision. That direction along with the location of the user from the GPS device may be used to define the region of the user's environment in the direction of user's field vision.

The exemplary pair of AR glasses (104) of FIG. 2 includes one or more input/output adapters (178). Input/output interface adapters in computers implement user-oriented input/output through, for example, software drivers and computer hardware for controlling output to speakers (171), as well as user input from user input devices such as a microphone (176).

The exemplary pair of AR glasses (104) of FIG. 2 includes a communications adapter (167) for implementing data communications (184) with other devices including, for example, a personal digital assistant ('PDA') (112), a server (106), or a laptop (116). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for augmenting reality for a user according to embodiments of the present invention include modems for wired dial-up communications, Ethernet (IEEE 802.3) adapters for wired network communications, and 802.11g adapters for wireless network communications.

Figure 3:
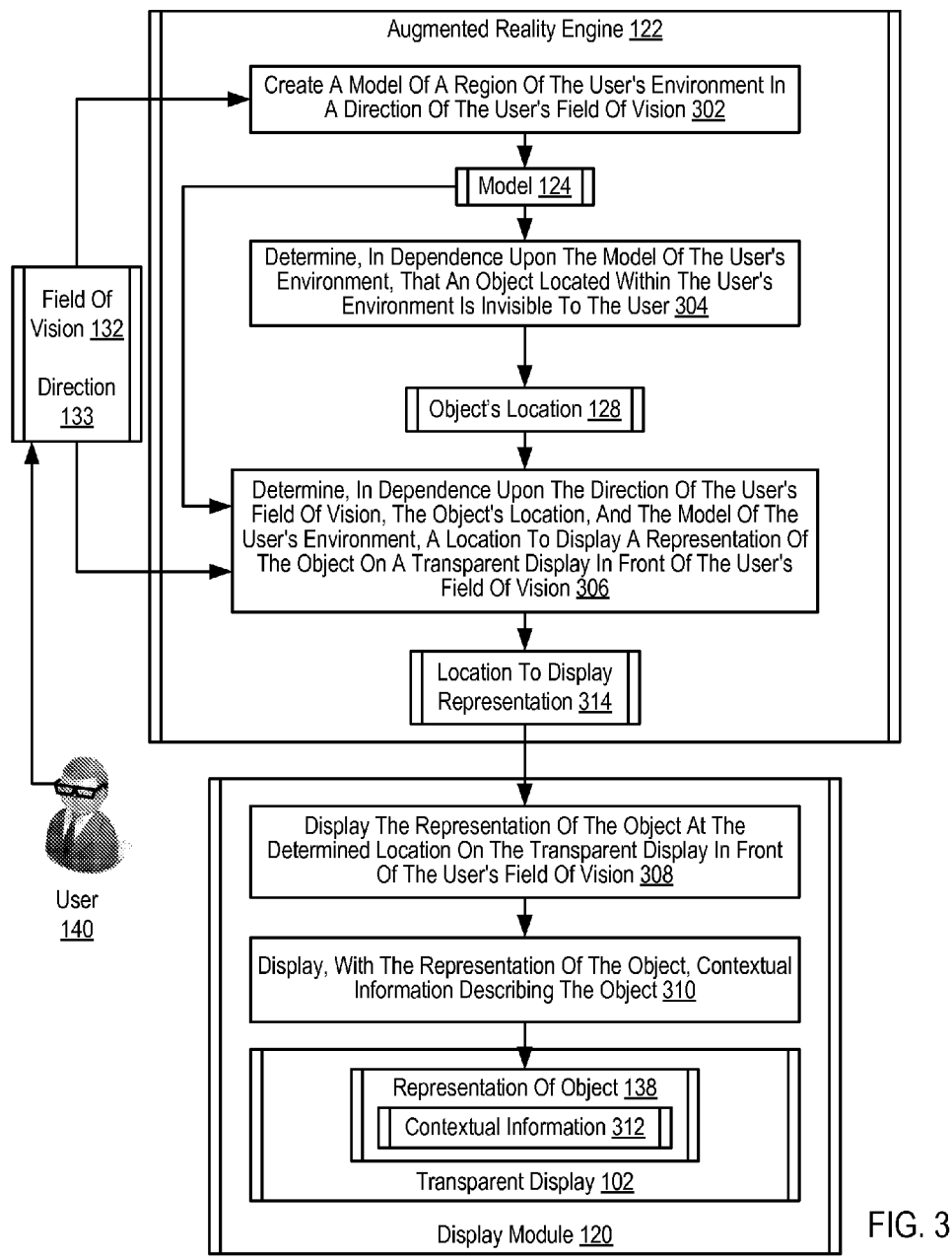
FIG. 3 sets forth a flow chart illustrating an exemplary method for augmenting reality for a user according to embodiments of the present invention.

For further explanation, FIG. 3 sets forth a flow chart illustrating an exemplary method for augmenting reality for a user according to embodiments of the present invention. The method of FIG. 3 includes creating (302) a model (124) of a region of the user's (140) environment in the direction (133) of the user's field of vision (132). The augmented reality engine (122) of FIG. 1 may create (302) a model (124) of a region of the user's (140) environment in the direction (133) of the user's field of vision (132) by determining the direction (133) of the user's field of vision from the user's orientation and location, and mapping images of the user's environment to corresponding latitude, longitude, and altitude coordinates. As mentioned above, other data, in addition to images of the user's environment, may be used to create a model including for example, relief map data, blueprint data, and the like.

The method of FIG. 3 also includes determining (304), in dependence upon the model (124) of the region of the user's environment, that an object located within the user's environment is invisible to the user (140). Determining (304) that an object located within the user's environment is invisible to the user may be carried in various ways including, for example, identifying the object's location (128) within the user's environment; identifying the user's location within the user's environment, and determining, from the model of the region of the user's environment, that there is an obstruction located between the user and the object.

Another exemplary way of determining (304) that an object located within the user's environment is invisible to the user may include identifying the object's location (128) within the user's environment and determining, from the model of region of the user's environment, whether the object is located in an area of low light. Determining whether the object is located in an area of low light may be carried out in numerous ways including, for example, by determining from the time of day at the location of the object that the sun is set, determining from an infrared camera that object is in a low light area and other ways as will occur to those of skill in the art.

Another exemplary way of determining (304) that an object located within the user's environment is invisible to the user may include identifying the object's location (128) within the user's environment and determining, from weather RADAR imagery, that the weather conditions surrounding the object's location preclude visibility. Such weather conditions may include, for example, dense fog, heavy rain, or sand storms.

The method of FIG. 3 also includes determining (306), in dependence upon the direction of the user's field of vision (132), the object's location (128), and the model (124) of the region of the user's environment, a location (314) to display a representation of the object on a transparent display (102) in front of the user's (140) field of vision (132). Determining (306) a location to display a representation of the object on a transparent display (102) may be carried out by identifying a grid location of the object on the model of the region of the user's environment and mapping the grid location of the object on the model of the region of the user's environment to a grid location on the transparent display. As mentioned above, the model (124) may be implemented as a three dimensional map of the region of the user's environment defined by a grid representing latitude, longitude, and altitude. A grid location of the object on the model of the region of the user's environment may include one or more three dimensional coordinate sets which may mapped to one or more two dimensional coordinates defining the grid on the transparent display. Typically a representation of the object will projected at a location on the transparent display that corresponds to the location at which a user would be capable of viewing the object if the object were visible to the user.

The method of FIG. 3 also includes displaying (308) the representation (138) of the object at the determined location (314) on the transparent display (102) in front of the user's field of vision (132). The exemplary display module (120) of FIG. 3 may display (308) the representation (138) of the object on the transparent display (102) by projecting the representation of the object on the transparent display. Displaying (308) the representation (138) of the object may also include determining a size of the display. A user may, for example, increase the size of a representation of an object that is located a great distance from the user's location or decrease the size of a representation of an object that is located near to the user's location.

The method of FIG. 3 also includes displaying (310), with the representation (138) of the object, contextual information (312) describing the object. Contextual information may be implemented in various ways. Contextual information may be implemented, for example, as text describing various characteristics of the object. If the object is an automobile, for example, contextual information may be text describing the make, model, year, and vehicle identification number of the automobile. Contextual information may also be implemented, for example, as symbols. If the object is a harmful gas or radiation, for example, contextual information may be a warning symbol describing a harmful substance.

Exemplary embodiments of the present invention are described largely in the context of a fully functional computer system for animating speech of an avatar representing a participant in a mobile communication. Readers of skill in the art will recognize, however, that the present invention also may be embodied in a computer program product disposed on recordable media for use with any suitable data processing system. Such recordable media include magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of augmenting reality for a user, the method comprising:
   a computer creating a model of a region of an environment of the user in a direction of a field of vision of the user;
   the computer determining, in dependence upon the model of the region of the environment, that an object located within the environment is invisible to the user;
   the computer determining, in dependence upon the direction of the field of vision, a location of the object, and the model of the region of the environment, a location to display a representation of the object on a transparent display in front of the field of vision; and
   the computer displaying the representation of the object at the determined location on the transparent display in front of the field of vision.

2. The method of claim 1 further comprising:
   the computer displaying, with the representation of the object, contextual information describing the object.

3. The method of claim 1 wherein the computer determining, in dependence upon the model of the region of the environment, that an object located within the environment is invisible to the user comprises:
   the computer identifying a location of the object within the environment;
   the computer identifying a location of the user within the environment; and
   the computer determining, from the model of the region of the environment, that there is an obstruction located between the user and the object.

4. The method of claim 1 wherein the computer determining, in dependence upon the model of the region of the environment, that an object located within the environment is invisible to the user comprises:
   the computer identifying a location of the object within the environment; and
   the computer determining, from the model of the region of the environment, that the object is located in an area of low light.

5. The method of claim 1 wherein the computer determining, in dependence upon the direction of the field of vision, the location of the object, and the model of the region of the environment, a location to display a representation of the object on a transparent display in front of the field of vision comprises:
   the computer identifying a grid location of the object on the model of the region of the environment; and
   the computer mapping the grid location of the object on the model of the region of the environment to a grid location on the transparent display.

6. The method of claim 1 wherein the computer displaying the representation of the object at the determined location on the transparent display in front of the field of vision comprises the computer projecting the representation of the object on the transparent display.

7. A computer system for augmenting reality for a user, the apparatus comprising:
   one or more processors, one or more computer-readable memories, and one or more computer-readable tangible storage devices;
   program instructions, stored on at least one of the one or more storage devices for execution by at least one of the one or more processors via at least one of the one or more memories, to create a model of a region of an environment of the user in a direction of a field of vision of the user;
   program instructions, stored on at least one of the one or more storage devices for execution by at least one of the one or more processors via at least one of the one or more memories, to determine, in dependence upon the model of the region of the environment, that an object located within the environment is invisible to the user;
   program instructions, stored on at least one of the one or more storage devices for execution by at least one of the one or more processors via at least one of the one or more memories, to determine, in dependence upon the direction of the field of vision, a location of the object, and the model of the region of the environment, a location to display a representation of the object on a transparent display in front of the field of vision; and
   program instructions, stored on at least one of the one or more storage devices for execution by at least one of the one or more processors via at least one of the one or more memories, to display the representation of the object at the determined location on the transparent display in front of the field of vision.

8. The computer system of claim 7 further comprising program instructions, stored on at least one of the one or more storage devices for execution by at least one of the one or more processors via at least one of the one or more memories, to display, with the representation of the object, contextual information describing the object.

9. The computer system of claim 7 wherein the program instructions to determine that an object located within the environment is invisible to the user:
   identify a location of the object within the environment;
   identify a location of the user within the environment; and
   determine, from the model of the region of the environment, that there is an obstruction located between the user and the object.

10. The computer system of claim 7 wherein the program instructions to determine that an object located within the environment is invisible to the user:
    identify a location of the object within the environment; and
    determine, from the model of the region of the environment, that the object is located in an area of low light.

11. The computer system of claim 7 wherein the program instructions to determine, in dependence upon the direction of the field of vision, the location of the object, and the model of the region of the environment, a location to display a representation of the object on a transparent display in front of the field of vision:
    identify a grid location of the object on the model of the region of the environment; and
    map the grid location of the object on the model of the region of the environment to a grid location on the transparent display.

12. The computer system of claim 7 wherein the program instructions to display the representation of the object at the determined location on the transparent display in front of the field of vision project the representation of the object on the transparent display.

13. A computer program product for augmenting reality for a user, the computer program product comprising:
    one or more computer-readable tangible storage devices;
    program instructions, stored on at least one of the one or more storage devices, to create a model of a region of an environment of the user in a direction of a field of vision of the user;
    program instructions, stored on at least one of the one or more storage devices, to determine, in dependence upon the model of the region of the environment, that an object located within the the environment is invisible to the user;

program instructions, stored on at least one of the one or more storage devices, to determine, in dependence upon the direction of the field of vision, a location of the object, and the model of the region of the environment, a location to display a representation of the object on a transparent display in front of the field of vision; and program instructions, stored on at least one of the one or more storage devices, to display the representation of the object at the determined location on the transparent display in front of the field of vision.

14. The computer program product of claim 13 further comprising program instructions, stored on at least one of the one or more storage devices, to display, with the representation of the object, contextual information describing the object.

15. The computer program product of claim 13 wherein program instructions to determine that an object located within the environment is invisible to the user:

identify a location of the object within the environment;

identify a location of the user within the environment; and determine, from the model of the region of the environment, that there is an obstruction located between the user and the object.

16. The computer program product of claim 13 wherein program instructions to determine that an object located within the environment is invisible to the user:

identify a location of the object within the environment; and determine, from the model of the region of the environment, that the object is located in an area of low light.

17. The computer program product of claim 13 wherein program instructions to determine, in dependence upon the direction of the field of vision, the location of the object, and the model of the region of the environment, a location to display a representation of the object on a transparent display in front of the field of vision:

identify a grid location of the object on the model of the region of the environment; and map the grid location of the object on the model of the region of the environment to a grid location on the transparent display.

18. The computer program product of claim 13 wherein program instructions to display the representation of the object at the determined location on the transparent display in front of the field of vision project the representation of the object on the transparent display.

\* \* \* \* \*